United States Patent
Kono et al.

(10) Patent No.: US 11,075,864 B2
(45) Date of Patent: Jul. 27, 2021

(54) COMPUTER-READABLE RECORDING MEDIUM RECORDING CONVERSATION CONTROL PROGRAM, CONVERSATION CONTROL METHOD, AND INFORMATION PROCESSING DEVICE

(71) Applicant: FUJITSU LIMITED, Kawasaki (JP)

(72) Inventors: Taki Kono, Kodaira (JP); Yu Tomita, Fujisawa (JP); Masahiro Koya, Machida (JP); Hiroyuki Kashiwagi, Kure (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/988,884

(22) Filed: Aug. 10, 2020

(65) Prior Publication Data
US 2020/0374245 A1    Nov. 26, 2020

Related U.S. Application Data

(63) Continuation of application No. PCT/JP2018/006644, filed on Feb. 23, 2018.

(51) Int. Cl.
*H04L 12/58* (2006.01)

(52) U.S. Cl.
CPC .............. *H04L 51/02* (2013.01); *H04L 51/22* (2013.01)

(58) Field of Classification Search
CPC ..... H04L 51/16; H04L 51/04; H04L 12/1813; H04L 51/046; H04L 51/32; H04L 51/02; H04L 51/58; H04L 51/22; G06Q 10/101; G06Q 50/01; H04N 7/157; H04Q 7/20; G06F 13/00
See application file for complete search history.

(56) References Cited

U.S. PATENT DOCUMENTS

| | | | | |
|---|---|---|---|---|
| 6,630,944 B1* | 10/2003 | Kakuta | ................. | G06Q 10/10 715/758 |
| 7,603,413 B1* | 10/2009 | Herold | .................. | G06Q 10/10 709/204 |
| 7,987,091 B2* | 7/2011 | Aoyama | ................. | G10L 15/22 704/245 |
| 7,991,825 B2 | 8/2011 | Koseki et al. | | |

(Continued)

FOREIGN PATENT DOCUMENTS

| | | |
|---|---|---|
| JP | 2009-205552 A | 9/2009 |
| JP | 2013-065276 A | 4/2013 |

(Continued)

OTHER PUBLICATIONS

International Search Report and Written Opinion of the International Searching Authority (Form PCT/ISA/210, 220, and 237), mailed in connection with PCT/JP2018/006644 and dated Apr. 24, 2018 (11 pages).

(Continued)

*Primary Examiner* — Sargon N Nano
(74) *Attorney, Agent, or Firm* — Fujitsu Patent Center

(57) ABSTRACT

A non-transitory computer readable recording medium records a conversation control program that causes a computer to execute processing including: receiving an instruction to change a specific input message among messages displayed in times series to another input message; and displaying the other input message and a response message to the other input message in time series.

9 Claims, 12 Drawing Sheets

(56) References Cited

U.S. PATENT DOCUMENTS

| | | | |
|---|---|---|---|
| 8,438,225 B2* | 5/2013 | Serr | G06Q 10/00 709/204 |
| 9,069,825 B1* | 6/2015 | Chang | G06F 16/9535 |
| 2004/0083432 A1* | 4/2004 | Kawamura | G06F 40/174 715/255 |
| 2006/0047362 A1* | 3/2006 | Aoyama | G10L 15/22 700/245 |
| 2006/0128404 A1* | 6/2006 | Klassen | H04M 1/72552 455/466 |
| 2006/0239221 A1* | 10/2006 | Burns | H04L 51/16 370/328 |
| 2009/0228961 A1* | 9/2009 | Wald | G06Q 30/0209 726/4 |
| 2011/0263278 A1* | 10/2011 | Riddle | H04L 51/16 455/466 |
| 2013/0041956 A1* | 2/2013 | Davenport | H04L 51/04 709/206 |
| 2014/0122056 A1 | 5/2014 | Duan | |
| 2014/0122083 A1 | 5/2014 | Xiaojiang | |
| 2014/0122619 A1* | 5/2014 | Duan | G06F 40/20 709/206 |
| 2014/0164953 A1* | 6/2014 | Lynch | H04L 51/046 715/753 |
| 2014/0207882 A1* | 7/2014 | Joo | H04L 51/02 709/206 |
| 2014/0310365 A1* | 10/2014 | Sample | H04L 51/16 709/206 |
| 2015/0212663 A1* | 7/2015 | Papale | G06F 16/248 715/762 |
| 2015/0295873 A1* | 10/2015 | Orr | G06F 3/04842 715/752 |
| 2017/0118152 A1* | 4/2017 | Lee | H04L 51/04 |
| 2017/0132228 A1 | 5/2017 | Baughman et al. | |
| 2017/0180284 A1* | 6/2017 | Smullen | H04L 69/14 |
| 2018/0241701 A1 | 8/2018 | Miyajima | |
| 2018/0287982 A1* | 10/2018 | Draeger | H04L 51/16 |
| 2018/0356952 A1* | 12/2018 | Boothroyd | H04L 51/16 |

FOREIGN PATENT DOCUMENTS

| | | |
|---|---|---|
| JP | 2016-091463 A | 5/2016 |
| WO | 2017/068817 A1 | 4/2017 |

OTHER PUBLICATIONS

Anonymous, "Chatbot", Dec. 21, 2017, pp. 1-8, XP055731934, Retrieved from the Internet: URL:https://en.wikipedia.org/w/index.php?title=Chatbot&oldid=816531650 [retrieved on Sep. 18, 2020], XP055731934.
Extended European Search Report dated Feb. 9, 2021 for corresponding European Patent Application No. 18907133.5, 9 pages.
Japanese Office Action dated May 11, 2021 for corresponding Japanese Patent Application No. 2020-501944, with English Translation, 7 pages. Please note JP-2016-91463-A cited herewith, was previously cited in an IDS filed on Aug. 10, 2020.*

* cited by examiner

CONVERSATION ID = 01

TERMINAL ID = 1

| SEQUENCE ID | DATE AND TIME | OPTION | BRANCH ID | MESSAGE CONTENT |
|---|---|---|---|---|
| Q1 | 2017/12/1 10:00 |  | 1 | HOW DO YOU GO TO ○○ CITY? |
| A1 | 2017/12/1 10:01 | a, b, c | 1 | a. TRAIN  b. BUS  c. TAXI |
| Q2 | 2017/12/1 10:03 | a | 1 | TRAIN |
| A2 | 2017/12/1 10:04 | b | 1 | ... |
| Q2' | 2017/12/1 10:07 |  | 2 | BUS |
| A2' | 2017/12/1 10:08 |  | 2 | ... |

221 222 223 224

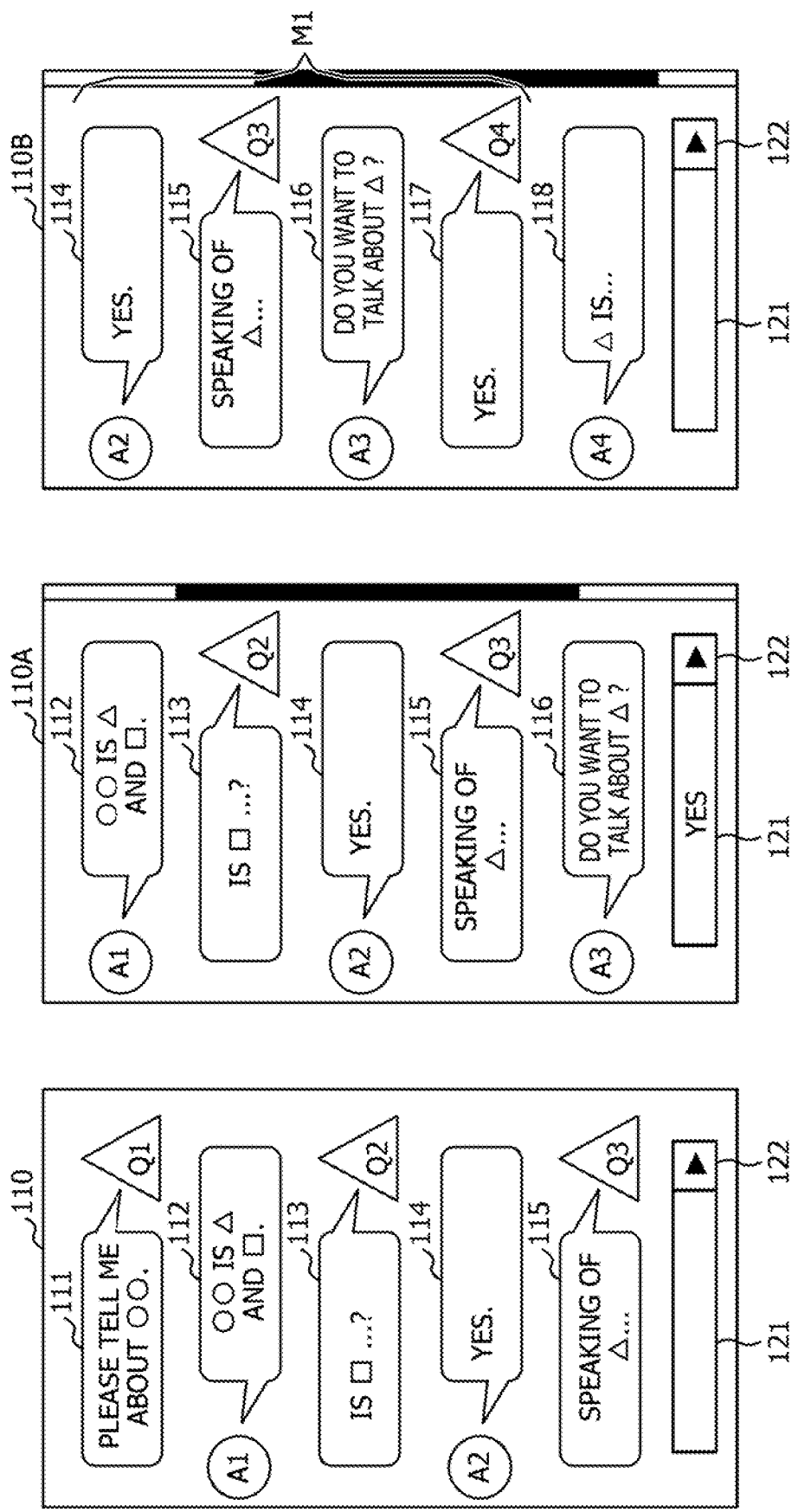

COMPUTER-READABLE RECORDING MEDIUM RECORDING CONVERSATION CONTROL PROGRAM, CONVERSATION CONTROL METHOD, AND INFORMATION PROCESSING DEVICE

CROSS-REFERENCE TO RELATED APPLICATION

This application is a continuation application of International Application PCT/JP2018/006644 filed on Feb. 23, 2018 and designated the U.S., the entire contents of which are incorporated herein by reference.

FIELD

The present embodiment relates to a conversation control program a conversation control method, and a conversation control device.

BACKGROUND

As one of technologies using the artificial intelligence, an automatic conversation program (chatbot) that answers an expected question has been known.

Related art is disclosed in Japanese Laid-open Patent Publication No. 2009-205552 and Japanese Laid-open Patent Publication No. 2013-65276.

SUMMARY

According to an aspect of the embodiments, a non-transitory computer readable recording medium records a conversation control program that causes a computer to execute processing including: receiving an instruction to change a specific input message among messages displayed in times series to another input message; and displaying the other input message and a response message to the other input message in time series.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a conversation database according to the first embodiment.

FIG. 11 is a diagram illustrating a display example of a terminal device according to the second embodiment.

DESCRIPTION OF EMBODIMENTS

In conversations between people, each person memorizes the flow of the conversation. Therefore, even in a case where the conversation in the past is repeated, a new answer other than an answer that has been already made can be made. On the other hand, the chatbot returns an answer same as that made in the past when the conversation in the past is repeated. Therefore, in order to obtain a new answer from the chatbot, it is necessary to trace the conversation in the past and ask a question again as changing the content of the question in the past.

Furthermore, conventionally, all the questions and the answers in the chat are displayed in time series. Therefore, in a case where the question in the past is changed, the questions in the past of which the content is changed and the answers to the question are displayed as a latest conversation. It cannot be displayed from which question the latest conversation is derived from among the questions displayed as the conversation in the past.

Visibility of chat may be improved.

First Embodiment

Figure 1:
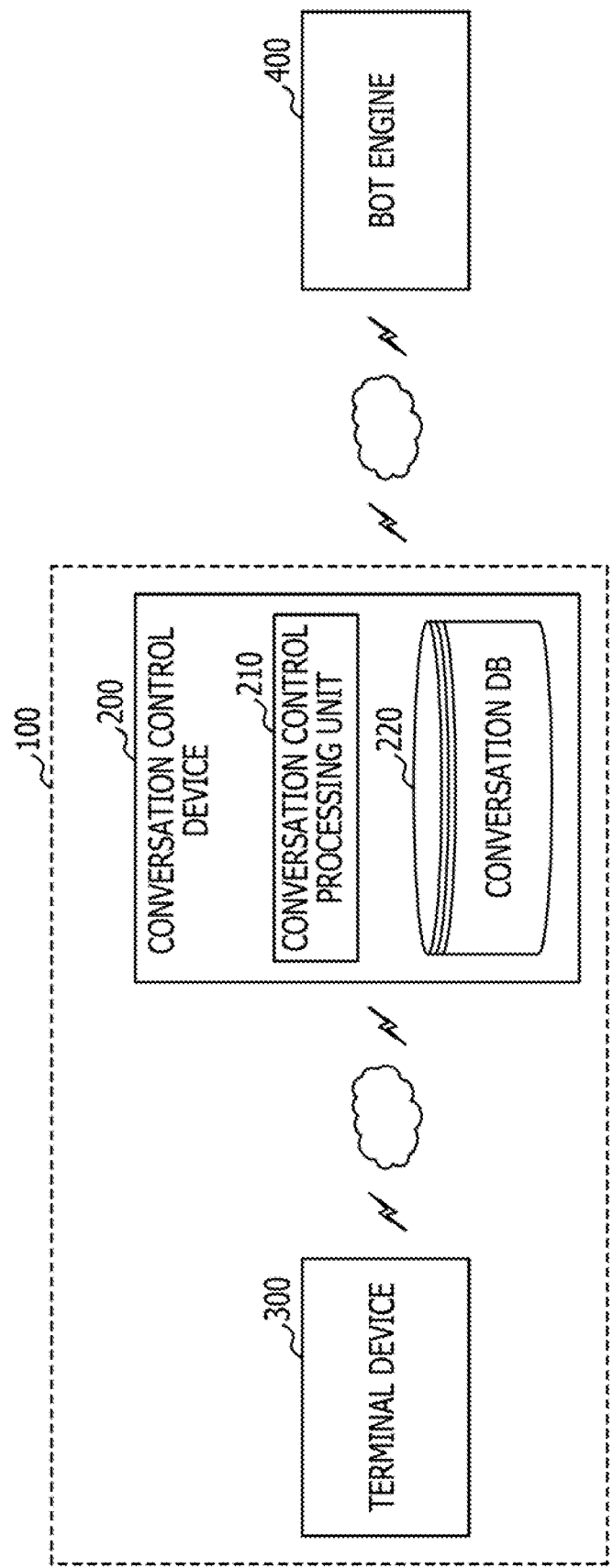
FIG. 1 is a diagram illustrating an example of a system configuration of a conversation control system according to a first embodiment

Hereinafter, a first embodiment will be described with reference to the drawings. FIG. 1 is a diagram illustrating an example of a system configuration of a conversation control system according to the first embodiment.

A conversation control system 100 according to the present embodiment includes a conversation control device 200 and a terminal device 300. The conversation control device 200 and the terminal device 300 are connected to each other via a network or the like.

Furthermore, in the conversation control system 100 according to the present embodiment, the conversation control device 200 is connected to a bot engine 400 via a network or the like and communicates with the bot engine 400.

The bat engine 400 is a computer in which an automatic conversation program that automatically performs conversation through an input message is installed. The message may be input as voice or text data.

In the present embodiment, when a message is input from the terminal device 300 via the conversation control device 200, the bot engine 400 outputs a message responding to the input message. The message output from the bot engine 400 is displayed on the terminal device 300 via the conversation control device 200. In this way, the conversation control system 100 according to the present embodiment realizes a chat between the terminal device 300 and the bat engine 400. Note that the chat means real-time communication using a data communication line on a computer network including the Internet.

The conversation control device 200 according to the present embodiment includes a conversation control processing unit 210 and a conversation database 220.

The conversation control processing unit 210 according to the present embodiment controls conversation between the terminal device 300 and the bot engine 400. Note that the conversation between the terminal device 300 and the bot engine 400 according to the present embodiment indicates exchange of the message between the terminal device 300 and the bot engine 400.

The conversation database 220 according to the present embodiment stores information regarding a history of the conversation between the terminal device 300 and the bat engine 400.

Note that, in the present embodiment, the message input from the terminal device 300 and the message responded from the bot engine 400 may be indicated by voice or text data. Furthermore, in the present embodiment, in a case where the message is exchanged by voice, the message is changed into the text data by a voice recognition function of any one of the conversation control device 200, the terminal device 300, or the bot engine 400 and displayed on the terminal device 300.

In the following description, the message input from the terminal device 300 is referred to as an input message, and the message that is output from the bot engine 400 in response to the input message is referred to as a response message. Specifically, for example, the input message input by the terminal device 300 is a question to the bot engine 400, and the response message output from the hot engine 400 is an answer to the question.

The text data indicating the input message and the response message is displayed on the terminal device 300 in time series as the information indicating the history of the conversation.

When receiving an instruction to change a certain input message among the input messages displayed on the terminal device 300 to another message, the conversation control processing unit 210 according to the present embodiment makes the terminal device 300 display the other message and a response message to the other message in time series.

In other words, in the present embodiment, by referring to the history of the conversation displayed on the terminal device 300 and changing content of the input message in the past, the history of the conversation is branched from the changed input message.

In this way, in the present embodiment, by branching the history of the conversation from a point when the content of the message (question) in the conversation in the past is changed, it is possible to display the questions and the responses in the chat as a tree-like history, and it is possible to improve visibility of the chat.

Figure 2:
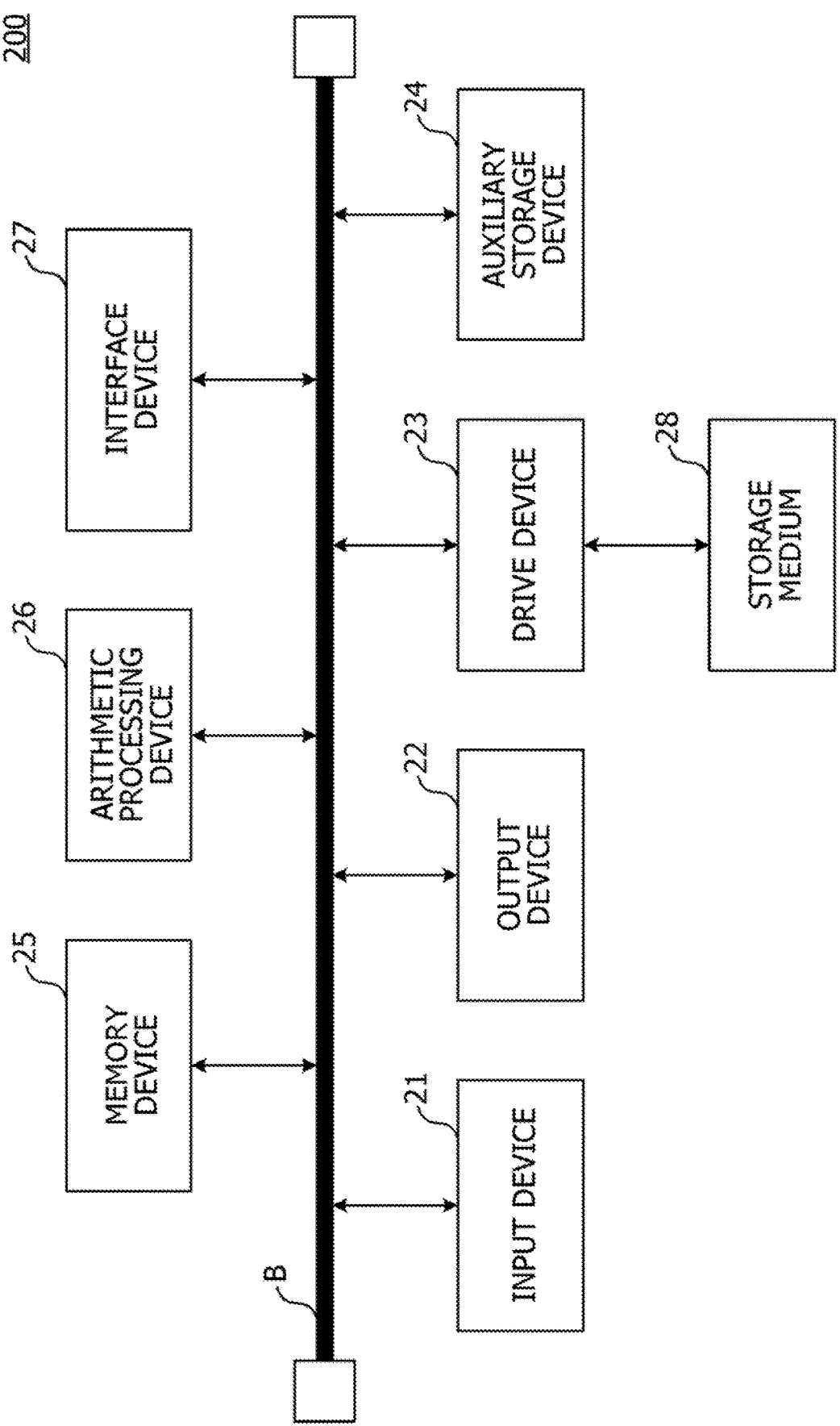
FIG. 2 is a diagram illustrating an exemplary hardware configuration of a conversation control device according to the first embodiment.

Hereinafter, the conversation control device 200 according to the present embodiment will be described. FIG. 2 is a diagram illustrating an exemplary hardware configuration of a conversation control device according to the first embodiment.

The conversation control device 200 according to the present embodiment includes an input device 21, an output device 22, a drive device 23, an auxiliary storage device 24, a memory device 25, an arithmetic processing device 26, and an interface device 27, all of which are mutually connected by a bus B.

The input device 21 is a device that inputs various information and is realized by, for example, a keyboard, a pointing device, or the like. The output device 22 outputs various information and is realized by, for example, a display or the like. The interface device 27 includes a local area network (LAN) card or the like, and is used for connection to a network.

A conversation control program that realizes the conversation control processing unit 220 or the like is at least a part of various programs that control the conversation control device 200. The conversation control program is provided by, for example, distribution of a storage medium 28, download from a network, or the like. As the storage medium 28 that records the conversation control program, it is possible to use various types of storage media such as storage media that optically, electrically, or magnetically record information such as a CD-ROM, a flexible disk, or a magneto-optical disc, a semiconductor memory that electrically records information such as a ROM or a flash memory, and the like.

Furthermore, when the storage medium 28 that records the conversation control program is set in the drive device 23, the conversation control program is installed from the storage medium 28 to the auxiliary storage device 24 via the drive device 23. The conversation control program downloaded from the network is installed to the auxiliary storage device 24 via the interface device 27.

The auxiliary storage device 24 stores the installed conversation control program and stores necessary files, data, or the like such as the conversation database 210 or the like. The memory device 25 reads the conversation control program from the auxiliary storage device 24 when the conversation control device 200 is activated and stores the read conversation control program. Then, the arithmetic processing device 26 realizes various processing to be described later in accordance with the conversation control program stored in the memory device 25.

Figure 3:
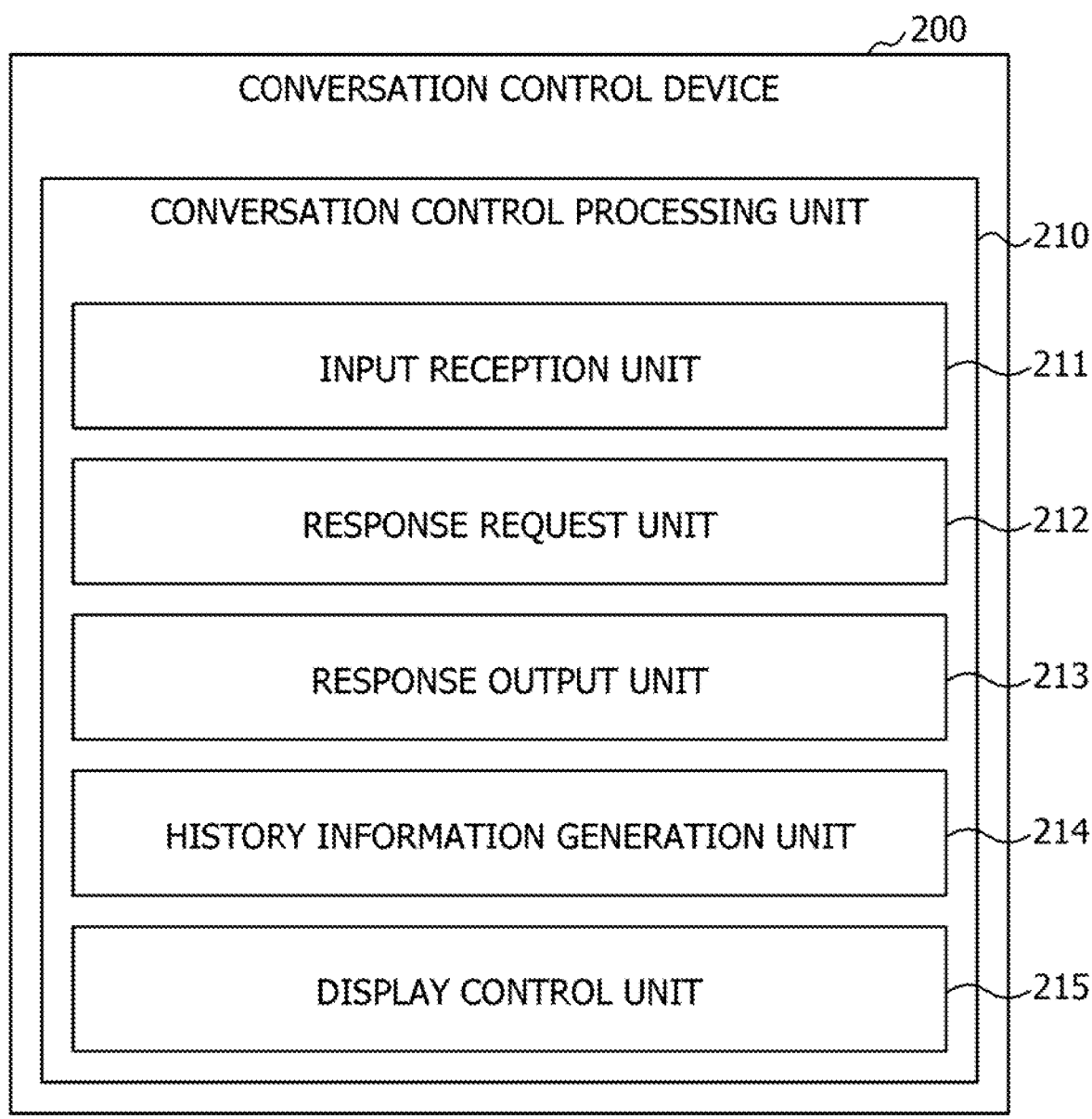
FIG. 3 is a diagram for explaining a function of the conversation control device according to the first embodiment.

Next, a function of the conversation control device 200 according to the present embodiment will be described with reference to FIG. 3. FIG. 3 is a diagram for explaining a function of the conversation control device according to the first embodiment.

The conversation control processing unit 210 of the conversation control device 200 according to the present embodiment includes an input reception unit 211, a response request unit 212, a response output unit 213, a history information generation unit 214, and a display control unit 215.

The input reception unit 211 receives an input of various information to the conversation control device 200. Specifically, the input reception unit 211 receives the input message input from the terminal device 300, an instruction to change the message input from the terminal device 300, or the like.

The response request unit 212 transmits the input message received by the input reception unit 211 to the bot engine 400 and requests the response message.

The response output unit 213 outputs the response message, acquired from the bot engine 400 in response to the request from the response request unit 212, to the terminal device 300.

The history information generation unit 214 generates history information indicating a history of the conversation mediated by the conversation control processing unit 210 and stores the generated information in the conversation database 220. Details of the history information generated by the history information generation unit 214 will be described later.

The display control unit 215 controls display on the terminal device 300. Specifically, the display control unit 215 may generate screen data to be displayed on the terminal device 300 or may notify the terminal device 300 of information indicating a place where data used to display a screen is stored in response to an access from the terminal device 300.

Next, the history information generated by the history information generation unit 214 according to the present embodiment will be described with reference to FIG. 4. FIG. 4 is a diagram illustrating an example of a conversation database according to the first embodiment. The conversation database 220 according to the present embodiment is provided, for example, for each terminal device 300.

The conversation database 220 according to the present embodiment includes a conversation ID, a sequence ID, a date and time, an option, a branch ID, message content as information items. In the conversation database 220, the item "sequence ID" is associated with the items "date and time", "option", "branch ID", and "message content", and the item "sequence No." is associated with the item "conversation ID". The history information according to the present embodiment is information including a value of the item "conversation ID" and a value of other item associated with the item "conversation ID" in the conversation database 220.

The value of the item "conversation ID" is given for each exchange of a series of messages from start of the conversation of the terminal device 300 with the bat engine 400 to end of the conversation.

The value of the item "sequence ID" is an identifier used to specify each of the input messages input from the terminal device 300 and each of the response messages output from the bot engine 400. The value of the item "sequence ID" is given to each message each time when the conversation control processing unit 210 receives the input message and the response message.

Furthermore, in the present embodiment, for the input message input from the terminal device 300, the value of the item "sequence ID" may include a character of "Q", and the value of the item "sequence ID" of the response message output from the bot engine 400 may include a character of "A". In this way, it is possible to indicate whether the message specified by the sequence ID is an input message or a response message. Note that whether the message is an input message or a response message may be specified by other methods.

A value of the item "date and time" indicates a date and time when the conversation control processing unit 210 has received the input message or the response message specified by the corresponding sequence ID.

A value of the item "option" indicates an option included in the message. More specifically, the value of the item "option" may indicate an option as an answer to a question indicated by the input message, in the response message output from the bot engine 400.

A value of the item "branch ID" is given to the input message and the response message regarding the question for each question included in the input message. In other words, the value of the item "branch ID" that is given is different for each time when the input message that has input in the past is changed.

A value of the item "message content" indicates content of the input message or the response message.

In FIG. 4, for example, it is understood that a response message having a sequence ID "A1" is received with respect to an input message having a sequence ID "Q1" in a conversation having a conversation ID "01" between a terminal device 300 having a terminal ID "1" and the bot engine 400.

Furthermore, it is understood that the response message having the sequence ID "A1" includes "a, b, and c" as options.

Figure 5A:
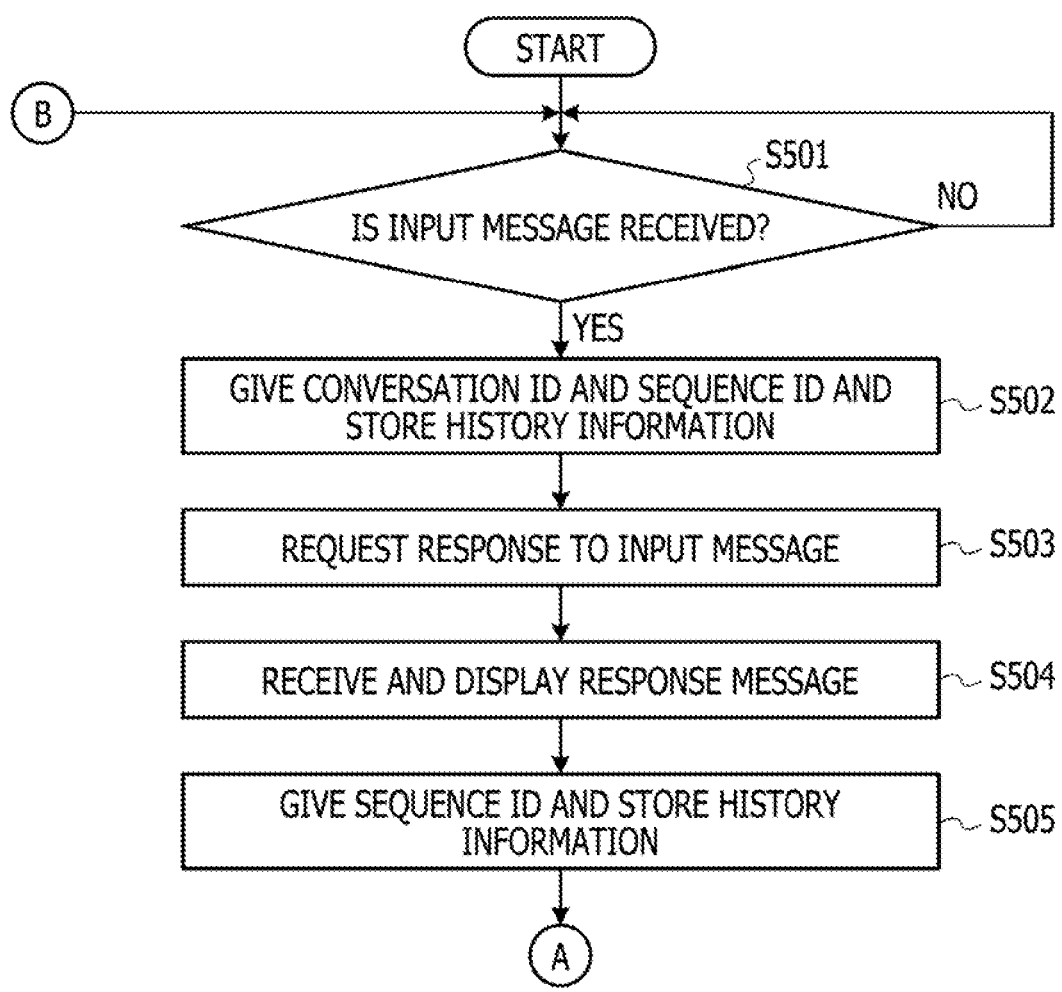
FIGS. 5A and 5B are a flowchart for explaining an operation of the conversation control device according to the first embodiment.
Figure 5B:
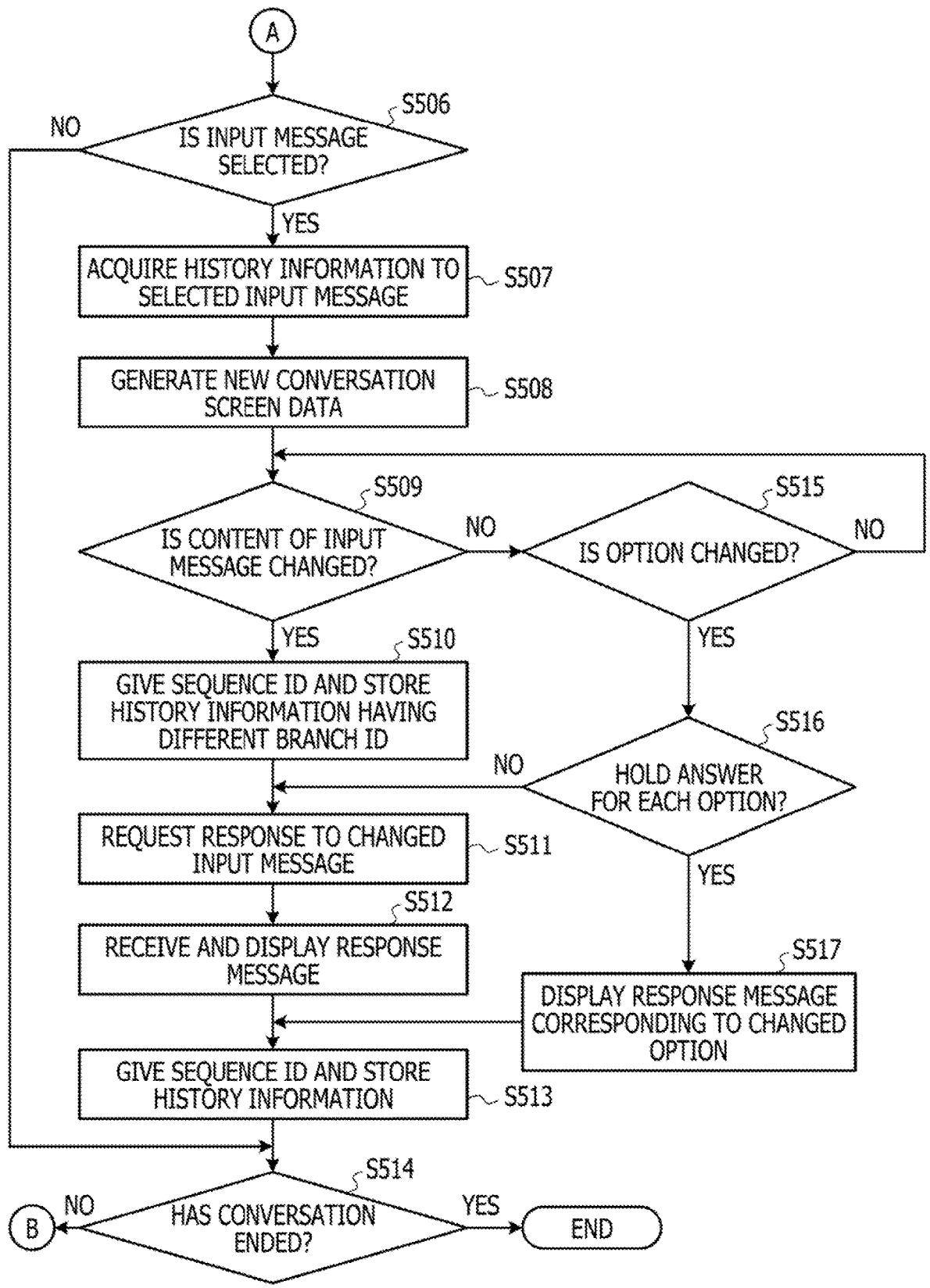

Next, an operation of the conversation control device 200 according to the present embodiment will be described with reference to FIGS. 5A and 5B. FIGS. 5A and 5B are a flowchart for explaining an operation of the conversation control device according to the first embodiment.

The conversation control device 200 according to the present embodiment determines whether or not the input message from the terminal device 300 is received by the input reception unit 211 of the conversation control processing unit 210 (step S501). In a case where the input message is not received in step S501, the conversation control processing unit 210 waits until the input message is received.

When receiving the input message in step S501, the conversation control processing unit 210 stores the history information including the input message in the conversation database 220 by the history information generation unit 214 (step S502). Specifically, the history information generation unit 214 gives the conversation ID, gives the sequence ID and the branch ID to the input message, sets the input message, the sequence ID, information indicating the date and time when the input message is received, the branch ID in association with the conversation ID as the history information, and stores the history information in the conversation database 220.

Subsequently, the conversation control processing unit 210 requests the response message to the bot engine 400 by the response request unit 212 (step S503). When receiving the response message from the bot engine 400, the conversation control processing unit 210 displays the received response message on a conversation screen of the terminal device 300 by the display control unit 215 (step S504).

Subsequently, the conversation control processing unit 210 stores the history information including the response message in the conversation database 220 by the history information generation unit 214 (step S505). Specifically, the history information generation unit 214 gives the sequence ID and the branch ID to the response message, sets the sequence ID, the response message, information indicating the date and time when the response message is received, and the branch ID in association with the conversation ID given in step S502 as the history information, and stores the history information in the conversation database 220.

Note that, at this time, in a case where the response message includes an option, the history information generation unit 214 extracts the option and includes the extracted option in the history information in association with the sequence ID. Furthermore, the branch ID that is given here has the same value as the branch ID given to the input message that is input prior to the response message.

Subsequently, the conversation control processing unit 210 determines whether or not selection of a specific input message, from among the input messages input in the past, is accepted by the input reception unit 211 (step S506). In a case where the selection is not accepted in step S506, the conversation control processing unit 210 proceeds the procedure to step S514 to be described later.

In a case where the selection is accepted in step S506, the conversation control processing unit 210 acquires history information including each message from the input message that is input first to the selected input message from the conversation control processing unit 210 by the display control unit 215 (step S507).

Subsequently, the conversation control processing unit 210 generates data used to display a new conversation screen by the display control unit 215 (step S508).

Subsequently, the conversation control processing unit 210 determines whether or not change of content to the selected input message is accepted by the input reception unit 211 (step S509). More specifically, the input reception unit 211 determines whether or not the selected message itself is changed.

In a case where the change of the content is not accepted in step S509, the conversation control processing unit 210 proceeds the procedure to step S515 to be described later.

In a case where the change of the content is accepted in step S509, the conversation control processing unit 210 stores history information including the input message of which the content is changed in the conversation database 220 (step S510).

At this time, the history information generation unit 214 associates a branch ID having a value different from the branch ID corresponding to the selected input message with the input message of which the content is changed.

Subsequently, the conversation control processing unit 210 requests a response message, to the input message of which the content is changed, to the bot engine 400 by the response request unit 212 (step S511).

Subsequently, the conversation control processing unit 210 displays a new conversation screen including the input message of which the content is changed on the terminal device 300 by the display control unit 215 and displays the response message received from the bot engine 400 in the conversation screen by the response output unit 213 (step S512).

Subsequently, the conversation control processing unit 210 stores the history information including the response message in the conversation database 220 by the history information generation unit 214 (step S513).

Here, the value of the branch ID to be given to the response message is the same value as the branch ID given to the input message of which the content is changed.

Subsequently, the conversation control processing unit 210 determines whether or not an instruction to end the conversation is received by the input reception unit 211 (step S514). In a case where the instruction to end the conversation is not received in step S514, the conversation control processing unit 210 returns the procedure to step S501.

In a case where the instruction to end the conversation is received in step S514, the conversation control processing unit 210 ends the processing.

In a case where the change of the input message is not accepted in step S509, the input reception unit 211 determines whether or not the selected option is changed among the options included in the preceding response message (step S515). Specifically, for example, in a case where a first option is selected from among the options included in the response message that is precedingly displayed in the selected input message, the input reception unit 211 determines whether or not the first option is changed to the other option.

In a case where the option is not changed in step S515, the conversation control processing unit 210 returns the procedure to step S509.

In a case where the option is changed in step S515, the conversation control processing unit 210 determines whether or not an answer for each option is held by the response request unit 212 (step S516). Specifically, the response request unit 212 determines whether or not information indicating the answer for each option included in the response message prior to the selected input message has been received.

In a case where the answer for each option is not held in step S516, the conversation control processing unit 210 proceeds the procedure to step S511.

In a case where the answer for each option is held in step S516, the response output unit 213 displays an answer corresponding to the newly selected option on the terminal device 300 as a response message (step S517) and proceeds the procedure to step S513.

In this way, in the present embodiment, when the input message input in the conversation in the past is selected and the content is changed, the new conversation screen is generated, and the conversation regarding the changed content is displayed on the new conversation screen.

Therefore, according to the present embodiment, by displaying a conversation screen corresponding to a branch each time when the conversation in which the content of the input message is changed is branched, it is possible to set a question and an answer in the chat as a tree-like history, and it is possible to improve visibility of the chat.

Figure 6:
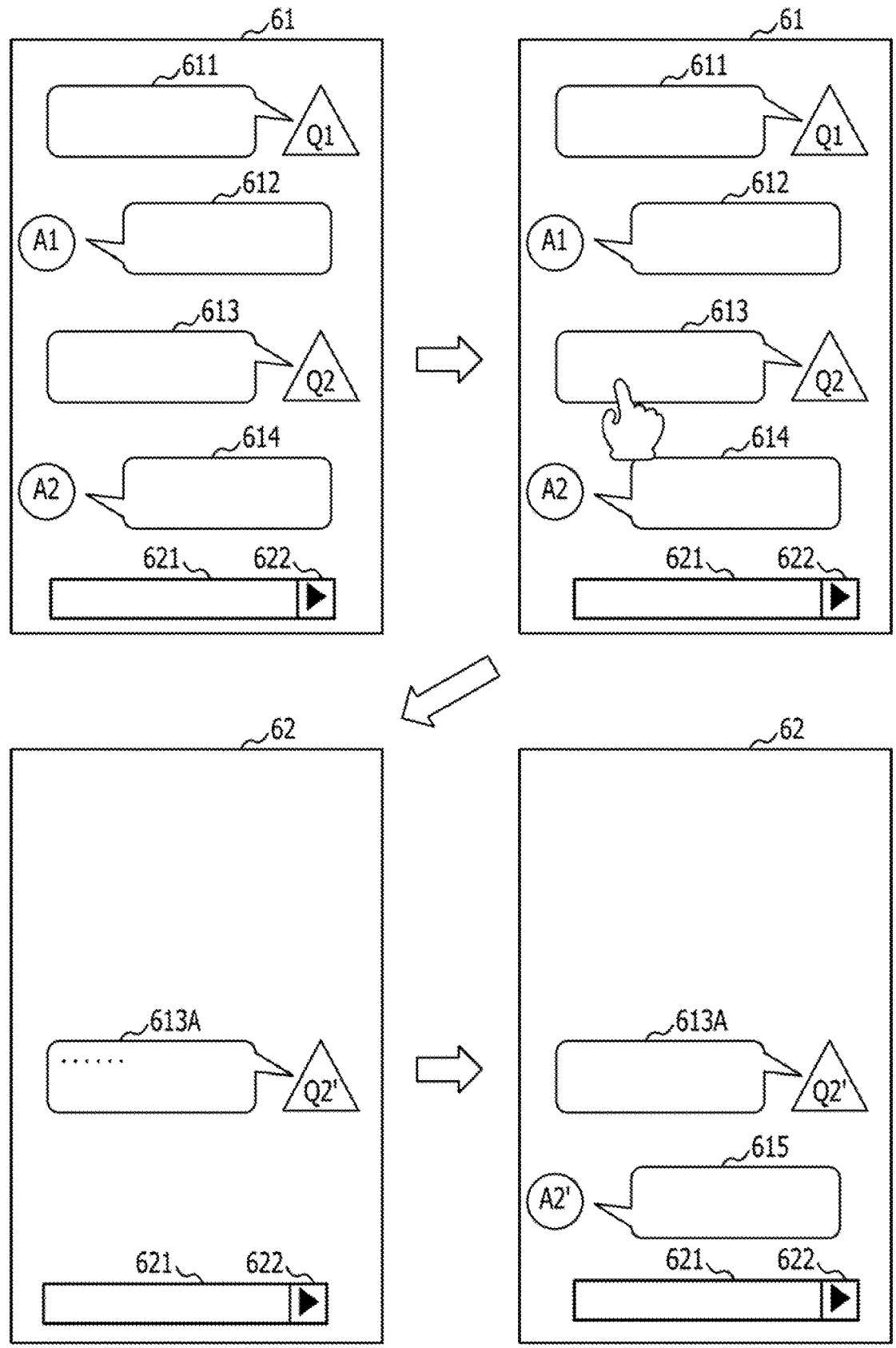
FIG. 6 is a first diagram illustrating a display example of a terminal device according to the first embodiment.

Hereinafter, a display example of the terminal device 300 according to the present embodiment will be described. FIG. 6 is a first diagram illustrating a display example of the terminal device according to the first embodiment.

A screen 61 illustrated in FIG. 6 indicates a conversation screen displayed on the terminal device 300. On the screen 61, an input message 611, a response message 612 to the input message 611, an input message 613, a response message 614 to the input message 613 are displayed in time series. Furthermore, on the screen 61, an input field 621 of the input message and a button 622 used to transmit the input message are displayed.

In the present embodiment, when a message is input to the input field 621 and the button 622 is operated, the message that has been input is transmitted to the conversation control device 200 as the input message.

Furthermore, in the present embodiment, for example, when the input message 613 is selected and the content of the input message 613 is changed to an input message 613A in the screen 61, the screen 61 transitions to a screen 62.

On the screen 62, the input message 613A including the content of the input message 613 that has been changed is displayed. In the present embodiment, when the input message 613A is transmitted to the conversation control device 200, a response message 615 from the bot engine 400 is displayed on the screen 62 as a response to the input message 613A.

That is, the screen 62 is a new conversation screen including the response message 615 to the input message 613A.

Furthermore, on the screen 62 in FIG. 6, while the input message 613A is input, the input message 611 that has been input prior to the selected input message 613 and the response message 612 are not displayed.

Therefore, according to the present embodiment, it is understood that the screen 62 is a new conversation screen that displays the new input message 613A being input.

Furthermore, in the present embodiment, after the input message 613A and the response message 615 are displayed on the screen 62 in FIG. 6, the input message 611 and the response message 612 that have been input in the past are not displayed.

In the present embodiment, a group of the messages that have been input in the past is not displayed so that the screen 62 can be used as a conversation screen regarding the input message 613A.

Moreover, when the terminal device 300 receives an operation for flicking the screen 62 or the like, the conversation control device 200 according to the present embodiment may switch the screen 62 displayed on the terminal device 300 to the screen 61. Note that the operation performed to switch the screen on the terminal device 300 is not limited to flick and, for example, may be a swipe operation or an operation on a button that is displayed for switching the screen.

Figure 7:
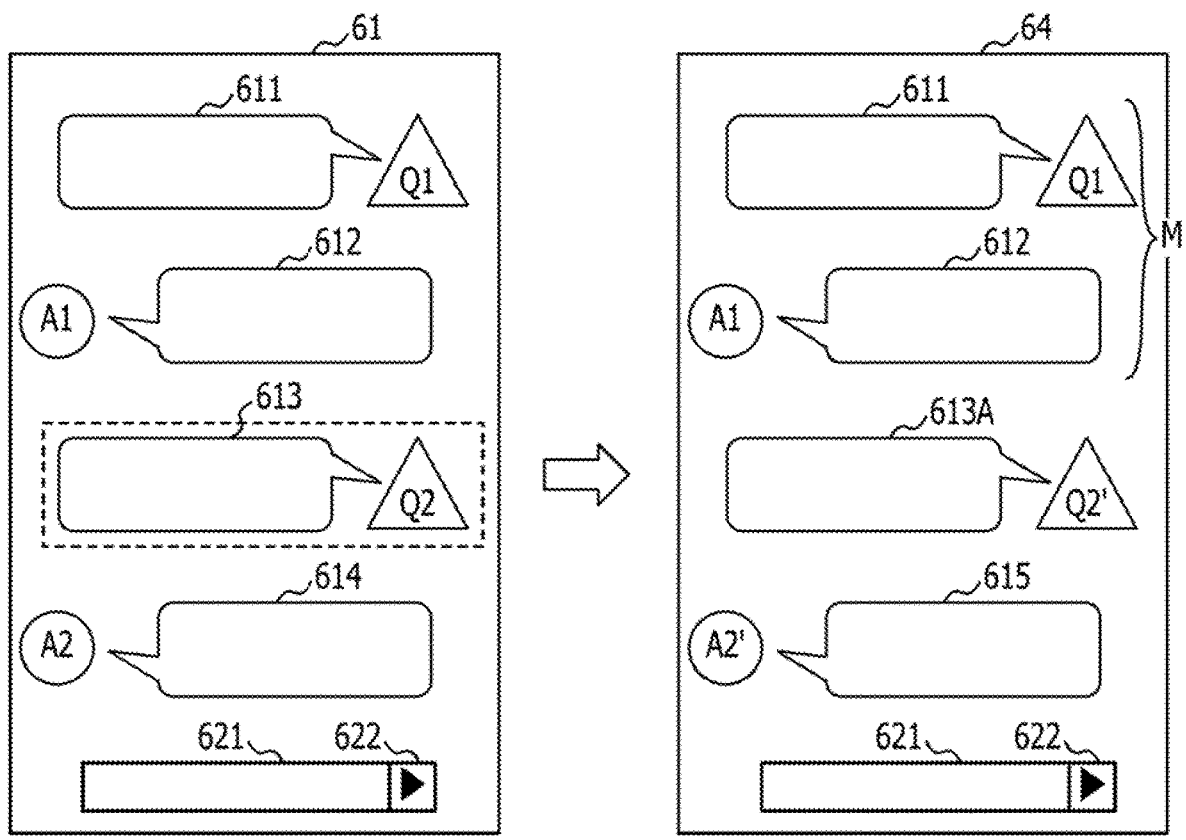
FIG. 7 is a second diagram illustrating the display example of the terminal device according to the first embodiment.

FIG. 7 is a second diagram illustrating a display example of the terminal device according to the first embodiment. In FIG. 7, an example is illustrated in which, after the input message 613A is input, the displayed input message 611 and response message 612 that have been input prior to the input message 613 are displayed on the screen 61.

On a screen 64 in FIG. 7, the input message 613A and the response message 615 are displayed, and the input message 611 and the response message 612 are displayed prior to the input message 613A.

In the example in FIG. 7, since a message group M indicating the conversation history in the past (input message 611 and response message 612) is displayed together with the input message 613, it is possible to easily recognize the flow of the conversation.

Figure 8:
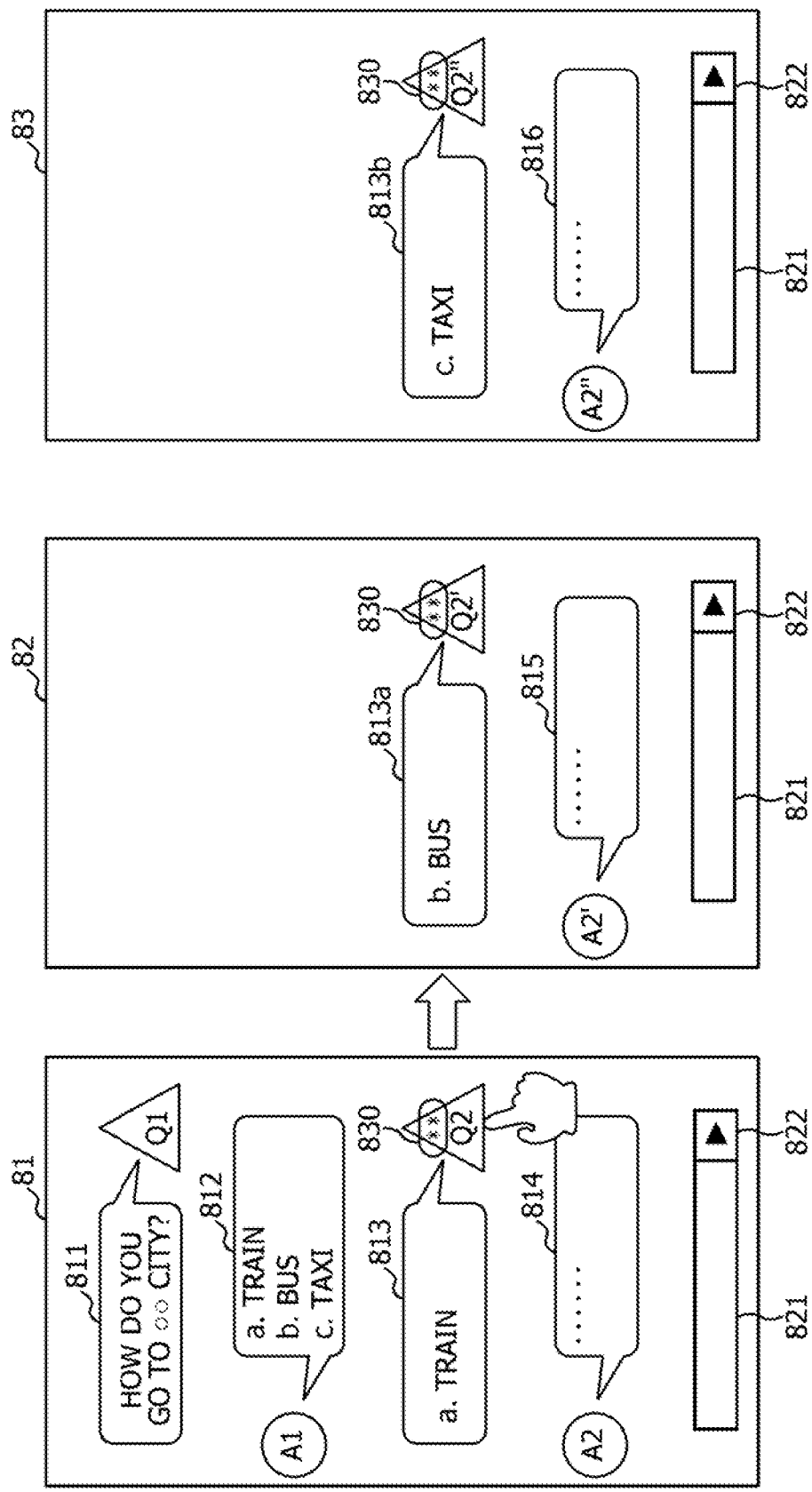
FIG. 8 is a third diagram illustrating the display example of the terminal device according to the first embodiment.

FIG. 8 is a third diagram illustrating a display example of the terminal device according to the first embodiment. In the example in FIG. 8, on a screen 81, a question "How do you go to ○○ city?" is displayed as an input message 811.

In this case, when the input message 811 is input to an input field 821 and a button 822 is operated, the history information generation unit 214 gives a conversation ID "01" to the started conversation and gives a sequence ID "Q1" and a branch ID "1" to the input message 811. Then, the history information generation unit 214 generates history information 221 in which the input message 811, a date and time when the input message 811 is received from the terminal device 300, the sequence ID "Q1", and the branch ID "1" are associated with the conversation ID "01" and stores the history information 221 in the conversation database 220 (refer to FIG. 4).

On the screen 81, as a response message 812 to the input message 811, "a. train, b. bus, c. taxi" is displayed.

In this case, the history information generation unit 214 of the conversation control processing unit 210 gives a sequence ID "A1" and a branch ID "1" to the response message 812 received from the bot engine 400. Furthermore, the history information generation unit 214 extracts three options "a, b, c" from the response message 812. Then, the history information generation unit 214 generates history information 222 in which a date and time when the response message 812 is received from the bot engine 400, the sequence ID "A1", the options "a, b, c", and the branch ID "1" are associated with the conversation ID "01" and stores the history information 222 in the conversation database 220 (refer to FIG. 4).

Furthermore, on the screen 81, an input message 813, with respect to the response message 812, indicating that the option a is selected is displayed.

In this case, when the input message 813 is input, the history information generation unit 214 gives a sequence ID "Q2" and a branch ID "1" to the input message 813. Then, the history information generation unit 214 generates history information 223 in which the input message 813, a date and time when the input message 813 is received from the terminal device 300, the sequence ID "Q2", the option "a", and the branch ID "1" are associated with the conversation ID "01" and stores the history information 223 in the conversation database 220 (refer to FIG. 4).

On the screen 81, a response message 814 to the input message 813 is displayed.

Furthermore, on the screen 81, a mark 830 is displayed in association with the input message 813. The mark 830 indicates the number of input messages changed from the input message 813 after the input message 813 is selected.

On the screen 81, the mark 830 includes two asterisks. This indicates that there are two other input messages obtained by changing the input message 813 after the input message 813 is selected. In other words, the mark 830 indicates that two kinds of different conversations are branched from the input message 813.

Screens 82 and 83 are examples of a conversation screen displayed in a case where the input message 813 is selected on the screen 81 and the selected option is changed to an option from the three options displayed in the preceding response message 812.

On the screen 82, an input message 813a in which the selected option is changed from a tot) and a response message 815 to the input message 813a are displayed. Here, the mark 830 is displayed in association with the input message 813a.

When the input message 813a is input, the history information generation unit 214 according to the present embodiment gives a sequence ID "Q2'" and a branch ID "2" to the input message 813a. Then, the history information generation unit 214 generates history information 224 in which the input message 813a, a date and time when the input message 813a is received from the terminal device 300, the sequence ID "Q2'", the option "b", and the branch ID "2" are associated with the conversation ID "01" and stores the history information 224 in the conversation database 220 (refer to FIG. 4).

In this way, in the present embodiment, the branch ID different from the value of the branch ID given to the input message 811 is given to the input message 813a changed from the input message 813. Furthermore, in the present embodiment, the branch ID "2" is also given to the response message 815 to the input message 813a.

In the present embodiment, in this way, the branch ID different from the branch ID corresponding to the selected input message is given to the input message branched from the selected input message. Furthermore, in the present embodiment, the input messages and the response messages to which different branch IDs are given are stored in association with the single conversation ID.

Therefore, the history information according to the present embodiment also plays a role as information indicating from which input message the input message is branched and how the input message is branched in the single conversation. In other words, the history information according to the present embodiment is information used to indicate the conversation as a tree-like structure.

On the screen 83, an input message 813b in which the selected option is changed from a to c and a response message 816 to the input message 813b are displayed. Here, the mark 830 is displayed in association with the input message 813b.

In the present embodiment, for example, when a flick operation on the screen 81 is received, the screen displayed on the terminal device 300 may be switched from the screen 81 to the screen 82. Furthermore, when the flick operation on the screen 82 is received, the screen displayed on the terminal device 300 may be switched from the screen 82 to the screen 81 or the screen 83 depending on a direction indicated by the flick operation.

Furthermore, in the present embodiment, when a flick operation on the screen 83 is received, the screen displayed on the terminal device 300 may be switched from the screen 83 to the screen 82.

Furthermore, in the present embodiment, it is understood that the response message to the changed input message is generated on the basis of the selected input message and the message prior to the selected input message.

Note that the mark 830 illustrated in FIG. 8 is asterisks as many as the input messages branched from the input message displayed on the screen. However, the mark 830 is not limited to this. The mark 830 may be, for example, a number indicating the number of branched input messages or any marks as many as the number indicating the number of input messages.

In the present embodiment, by displaying the mark 830, the input message can be indicated from which the conversation is branched. Furthermore, in the present embodiment, by selecting the input message displayed in association with the mark 830 and performing the flick operation or the like, it is possible to switch the display to the other conversation screen branched from this input message. Therefore, according to the present embodiment, the history including the questions and the answers can be easily traced.

As described above, according to the present embodiment, it possible to improve the visibility of the chat.

Second Embodiment

Hereinafter, a second embodiment will be described with reference to the drawings. The second embodiment is different from the first embodiment in that it is determined whether or not an input message includes content of a conversation in the past. Therefore, in a description of the second embodiment below, only differences from the first embodiment will be described, and those having functional configurations similar to those in the first embodiment will be denoted by reference signs similar to reference signs used in the description of the first embodiment, and a description thereof will be omitted.

Figure 9:
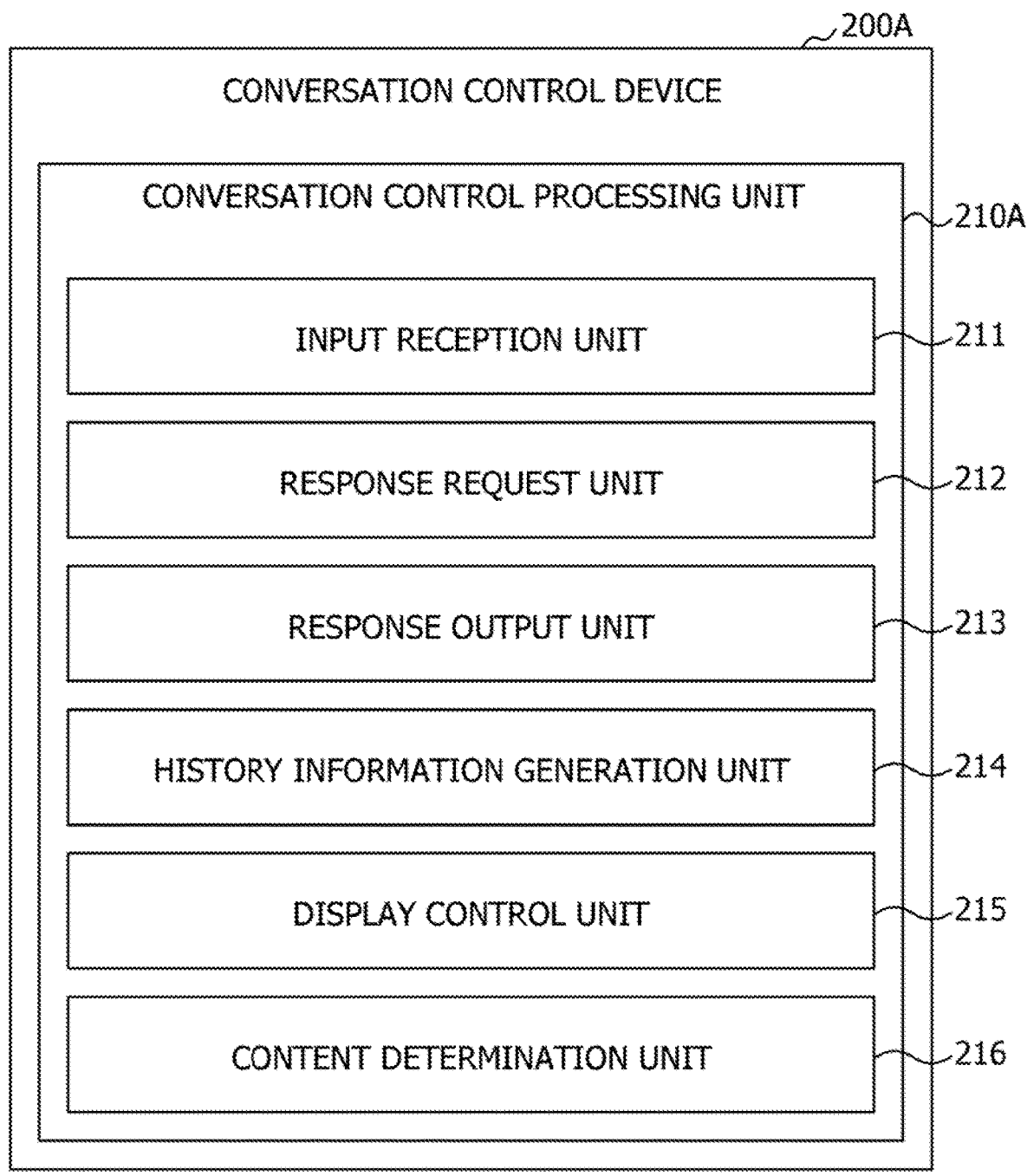
FIG. 9 is a diagram for explaining a function of a conversation control device according to a second embodiment.

FIG. 9 is a diagram for explaining a function of a conversation control device according to the second embodiment. A conversation control device 200A according to the present embodiment includes a conversation control processing unit 210A.

The conversation control processing unit 210A according to the present embodiment includes an input reception unit 211, a response request unit 212, a response output unit 213, a history information generation unit 214, a display control unit 215, and a content determination unit 216.

The content determination unit 216 according to the present embodiment determines whether or not an input message includes content similar to content included in any one of preceding input messages and response messages.

Figure 10:
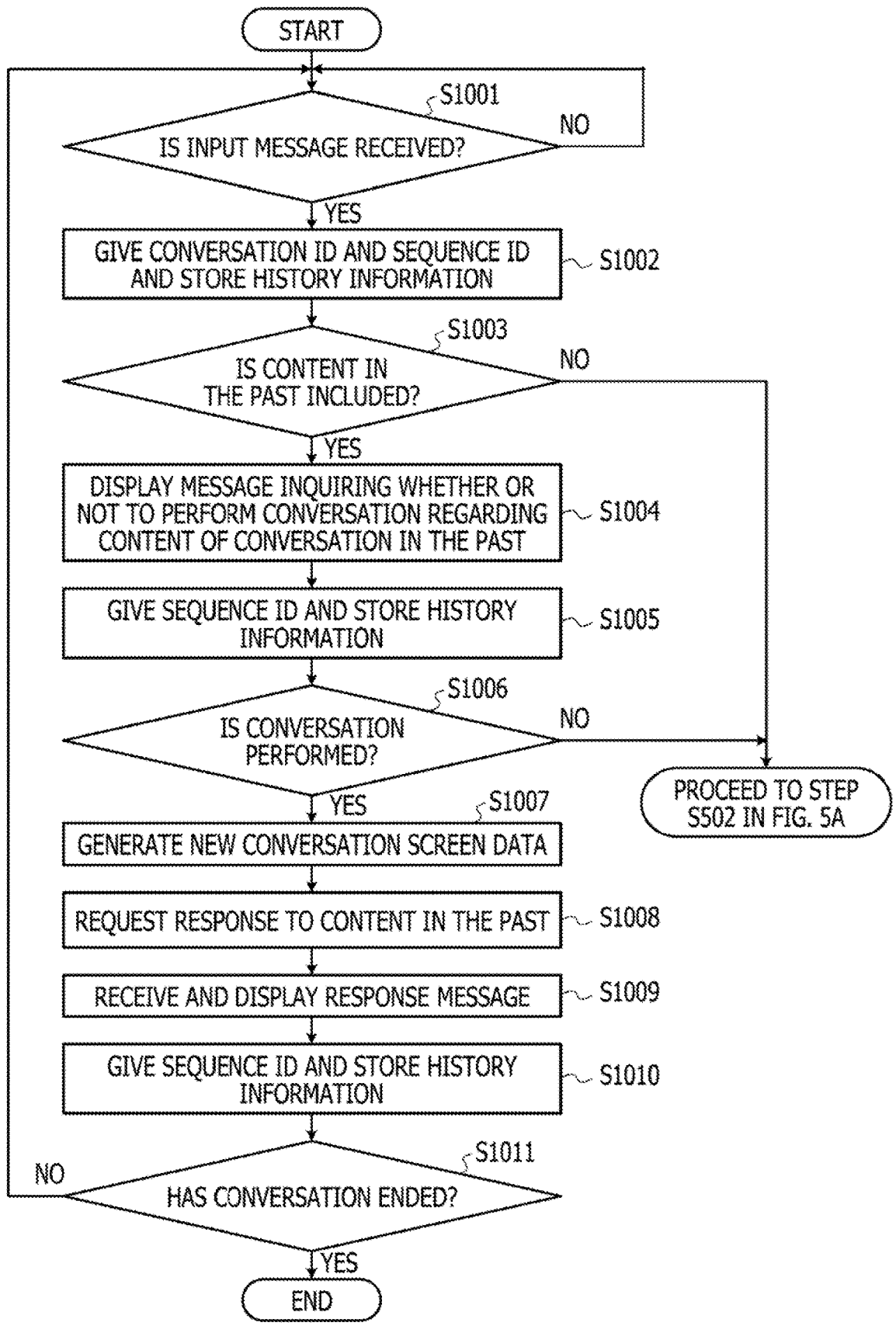
FIG. 10 is a flowchart for explaining an operation of the conversation control device according to the second embodiment.

FIG. 10 is a flowchart for explaining an operation of the conversation control device according to the second embodiment.

Since processing in steps S1001 and S1002 in FIG. 10 is similar to the processing in steps S501 and S502 in FIGS. 5A and 5B, description thereof will be omitted.

Subsequent to step S1002, the conversation control processing unit 210A determines whether or not the input message includes the content of the conversation in the past by the content determination unit 216 (step S1003). Specifically, when an input message that has been newly input includes a word similar to a word included in the response message displayed in the past, the content determination unit 216 may determine that the content similar to the content included in any one of the preceding input messages and response messages is included.

In a case where the content of the conversation in the past is not included in step S1003, the conversation control processing unit 210A proceeds the procedure to step S502 in FIGS. 5A and 5B.

In a case where the content of the conversation in the past is included in step S1003, the conversation control processing unit 210A displays a message inquiring whether or not a conversation regarding the content of the conversation in the past is performed again on a terminal device 300 by the display control unit 215 (step S1004). Specifically, the display control unit 215 may display a message, inquiring whether or not the conversation is performed regarding the word that has been determined to be included in the message in the past by the content determination unit 216, on the terminal device 300.

Subsequently, the conversation control processing unit 210A gives a sequence ID and a branch ID to the message generated in step S1004 by the history information generation unit 214, sets the sequence ID, the message, information indicating a date and time when the message is transmitted, and the branch ID in association with the conversation ID given in step S1002 as history information and stores the history information in a conversation database 220.

Subsequently, the conversation control processing unit 210A receives a response from the terminal device 300 by the input reception unit 211 (step S1006). Then, in a case of receiving a response indicating that the conversation regarding the content in the past is not performed in step S1005, the conversation control processing unit 210A proceeds the procedure to step S502 in FIGS. 5A and 5B.

Furthermore, in a case of receiving the response indicating that the conversation regarding the content in the past is performed in step S1005, the conversation control processing unit 210A generates new conversation screen data by the display control unit 215 (step S1007).

Subsequently, the conversation control processing unit 210A requests a bot engine 400 to make a response to the content in the past by the response request unit 212 (step S1008).

Subsequently, when receiving a response message from the bot engine 400, the conversation control processing unit 210A displays the response message on the terminal device 300 by the response output unit 213 (step S1009) and proceeds the procedure to step S1010.

Since the processing in steps S1010 and S1011 is similar to the processing in steps S513 and S514 in FIGS. 5A and 5B, description thereof will be omitted.

FIG. 11 is a diagram illustrating a display example of a terminal device according to the second embodiment. A screen 110 illustrated in FIG. 11 indicates a conversation screen displayed on the terminal device 300. On the screen 110, an input message 111 "Please tell me about ○○" and a response message 112 "○○ is Δ and □" to the input message 111 are displayed. Furthermore, on the screen 110, an input message 113 "Is □ . . . ?" and a response message 114 "Yes" to the input message 113 are displayed.

Moreover, an input message 115 "Speaking of Δ . . . " is displayed on the screen 110. Furthermore, an input field 121 and a transmission button 122 are displayed on the screen 110.

On the screen 110, the input message 115 includes a word "Δ" included in the response message 112 to the input message 111.

Therefore, in the present embodiment, as illustrated in a screen 110A, subsequent to the input message 115, a message 116 inquiring whether or not to perform a conversation regarding the content of the conversation in the past is displayed. On the screen 110A, "Do you want to talk about Δ?" is displayed as the message 116.

In response to the inquiry, "Yes" is input to the input field 121 on the screen 110A. When the button 122 is operated, the conversation control processing unit 210A displays a screen 110B that is a new conversation screen on the terminal device 300. In other words, in the present embodiment, when an input message indicating that the conversation regarding the content of the conversation in the past is performed, the screen 110B that is the new conversation screen is displayed on the terminal device 300.

Next, the conversation control processing unit 210A requests the bot engine 400 to make a response about "Δ" and displays a response message 117 acquired from the bot engine 400 on the screen 110B.

On the screen 110B, a message "The Δ is . . . " is displayed as the response message 117, and it is possible to start a conversation regarding the word "Δ" that has appeared in the response message 112 in the past.

Furthermore, in the present embodiment, when history information including the response message 117 is generated, a value of a branch ID given to the response message 117 is different from a value of a branch ID given to the input messages 111 to 116.

That is, according to the present embodiment, in a case where the input message includes the content of the conversation in the past, whether or not to branch the conversation from the input message is inquired, and the conversation is branched in response to the instruction to branch the conversation.

Furthermore, on the screen 110B in FIG. 8, a message group M1 including the input messages and the response message that are displayed prior to the response message 117 is displayed. However, the message group M1 may be hidden.

In this way, even in a case where the conversation regarding the content of the conversation in the past is performed, it is possible to manage the above conversation as the branch of the conversation.

The present invention is not limited to the embodiments specifically disclosed above, and various modifications and changes can be made without departing from the scope of the claims.

An examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer readable recording medium recording a conversation control program that causes a computer to execute processing comprising:

receiving an instruction to change a specific input message among messages which are displayed in times series and each is assigned a sequence identifier to another input message;

displaying the other input message and a response message to the other input message in time series; and storing the other input message which is assigned to a branch identifier which is different from the sequence identifier in association with the specific input message, wherein after the other input message and the response message to the other input message are displayed in time series, switching display to messages subsequent to the specific input message including the response message to the specific input message is accepted, and display is performed that indicates that the other input message regarding the specific input message among messages displayed by the switching exists.

2. The non-transitory computer readable recording medium according to claim 1, wherein while the other input message is input, control not to display a message prior to the specific input message or a message subsequent to the specific input message, or a combination thereof is not performed.

3. The non-transitory computer readable recording medium according to claim 1, wherein when the other input message and the response message to the other input message are displayed in time series, a response message prior to the specific input message or a preceding response message, or a combination thereof and a preceding input message corresponding to the preceding response message are displayed.

4. The non-transitory computer readable recording medium according to claim 1, wherein when the other input message and the response message to the other input message are displayed in times series, a message prior to the specific input message is not displayed.

5. The non-transitory computer readable recording medium according to claim 1, wherein the response message to the other input message is generated on a basis of the other input message and a message prior to the specific input message.

6. The non-transitory computer readable recording medium according to claim 1 wherein display is performed that indicates the number of other input messages regarding the specific input message among the messages displayed by the switching.

7. The non-transitory computer readable recording medium according to claim 1, wherein in a case where the input message includes content similar to content included in each message displayed in time series, a message inquiring whether or not a response message regarding the content is requested is displayed.

8. A conversation control method comprising: receiving, by a computer, an instruction to change a specific input message to another input message among messages which are displayed in times series and each is assigned a sequence identifier;

displaying the other input message and a response message to the other input message in time series; and storing the other input message which is assigned to a branch identifier which is different from the sequence identifier in association with the specific input message, wherein after the other input message and the response message to the other input message are displayed in time series, switching display to messages subsequent to the specific input message including the response message to the specific input message is accepted, and displaying is performed that indicates that the other input message regarding the specific input message among messages displayed by the switching exists.

9. An information processing device comprising:

a memory; and a processor coupled to the memory and configured to:
  receive an instruction to change a specific input message among messages which are displayed in time series and each is assigned a sequence identifier to another input message;
  display the other input message and a response message to the other input message in time series; and
  store the other input message which is assigned to a branch identifier which is different from the sequence identifier in association with the specific input message, wherein after the other input message and the response message to the other input message are displayed in time series, switching display to messages subsequent to the specific input message including the response message to the specific input message is accepted, and display is performed that indicates that the other input message regarding the specific input message among messages displayed by the switching exists.

\* \* \* \* \*